United States Patent
Yang et al.

(10) Patent No.: US 10,131,825 B2
(45) Date of Patent: Nov. 20, 2018

(54) OPTICAL MEMBER, PRESSURE-SENSITIVE ADHESIVE COMPOSITION AND LIQUID CRYSTAL DISPLAY

(71) Applicant: LG CHEM, LTD., Seoul (KR)

(72) Inventors: Se Woo Yang, Daejeon (KR); Ki Seok Jang, Daejeon (KR); Yong Su Park, Daejeon (KR); Min Soo Park, Daejeon (KR); Suk Ky Chang, Daejeon (KR); Jong Rok Jeon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 15/450,743

(22) Filed: Mar. 6, 2017

(65) Prior Publication Data

US 2017/0204294 A1   Jul. 20, 2017

Related U.S. Application Data

(63) Continuation of application No. 14/549,238, filed on Nov. 20, 2014, which is a continuation of application No. PCT/KR2013/004434, filed on May 21, 2013.

(30) Foreign Application Priority Data

May 21, 2012 (KR) .................. 10-2012-0053817
May 21, 2013 (KR) .................. 10-2013-0056939

(51) Int. Cl.
| | |
|---|---|
| C09J 133/10 | (2006.01) |
| C09J 133/12 | (2006.01) |
| C09J 133/08 | (2006.01) |
| C09J 133/06 | (2006.01) |
| C08L 33/08 | (2006.01) |
| C09J 7/38 | (2018.01) |
| G02F 1/1335 | (2006.01) |

(52) U.S. Cl.
CPC ............. *C09J 133/08* (2013.01); *C08L 33/08* (2013.01); *C09J 7/385* (2018.01); *C09J 133/066* (2013.01); *C09J 133/10* (2013.01); *C09J 133/12* (2013.01); *C08L 2312/00* (2013.01); *C09J 2201/606* (2013.01); *C09J 2203/318* (2013.01); *C09J 2433/00* (2013.01); *G02F 1/1335* (2013.01); *G02F 2202/28* (2013.01); *Y10T 428/265* (2015.01); *Y10T 428/2891* (2015.01); *Y10T 428/31938* (2015.04)

(58) Field of Classification Search
CPC .. C09J 133/08; C09J 2201/606; C09J 133/10; C09J 133/12; C09J 133/066; C09J 7/385; Y10T 428/31938; Y10T 428/1036; Y10T 428/1041; Y10T 428/1077; Y10T 428/1073
See application file for complete search history.

(56) References Cited

U.S. PATENT DOCUMENTS

| | | | |
|---|---|---|---|
| 2004/0017363 A1* | 1/2004 | Nakanishi | G06F 3/041 345/173 |
| 2005/0197450 A1* | 9/2005 | Amano | C08K 5/0075 525/30 |
| 2009/0110849 A1 | 4/2009 | Nishina | |
| 2010/0068515 A1 | 3/2010 | Paul et al. | 428/355 AC |
| 2010/0182679 A1* | 7/2010 | Han | C09J 133/14 359/359 |
| 2010/0239866 A1 | 9/2010 | Matsumura et al. | 428/413 |
| 2011/0236605 A1 | 9/2011 | Hattori et al. | 428/1.55 |
| 2012/0113361 A1* | 5/2012 | Huang | G06F 3/041 349/96 |
| 2013/0015909 A1* | 1/2013 | Kim | G06F 3/041 327/517 |
| 2013/0040123 A1* | 2/2013 | Cho | C09J 133/08 428/220 |

FOREIGN PATENT DOCUMENTS

| | | | |
|---|---|---|---|
| CN | 1764679 A | 4/2006 | |
| JP | 08-245805 A | 9/1996 | |
| JP | 2000186265 A | 7/2000 | ............ C09J 167/00 |
| JP | 2001-262103 A | 9/2001 | |
| JP | 2008214572 A | 9/2008 | |
| JP | 2008260824 A | 10/2008 | |
| JP | 200973896 A | 4/2009 | |
| JP | 2009108122 A | 5/2009 | |
| JP | 2010-254956 | 11/2010 | |
| JP | 2011-225764 A | 11/2011 | |
| KR | 10-2006-0594514 B1 | 6/2006 | |
| KR | 10-2007-0732927 B1 | 6/2007 | |
| KR | 10-2010-0049637 A | 5/2010 | |
| TW | 200600544 A | 1/2006 | |
| TW | 200604220 A | 2/2006 | |
| WO | 2007/034533 A1 | 3/2007 | |
| WO | WO 2011126262 A2 * | 10/2011 | ............ G06F 3/041 |
| WO | 2013118641 A1 | 8/2013 | |

OTHER PUBLICATIONS

Poly(2-ethylhexyl acrylate, polymerdatabase.com, 2015 [online], [retrieved on Oct. 30, 2017],[Retrieved from the internet <URL: http://polymerdatabase.com/polymers/poly2-ethylhexylacrylate.html>.*

Poly(2-ethylhexyl acrylate), polymers, polymerdatabase.com, Jun. 2015.

* cited by examiner

*Primary Examiner* — Sophie Hon
(74) *Attorney, Agent, or Firm* — Dentons US LLP

(57) ABSTRACT

Provided are an optical member, a pressure-sensitive adhesive composition, and an LCD. The optical member may have excellent endurance reliability even when a pressure-sensitive adhesive layer is formed to have a thickness of 20 μm or less.

6 Claims, No Drawings

OPTICAL MEMBER, PRESSURE-SENSITIVE ADHESIVE COMPOSITION AND LIQUID CRYSTAL DISPLAY

This application is a continuation application of U.S. patent application Ser. No. 14/549,238, filed Nov. 20, 2014, which is a bypass continuation application of International Application No. PCT/KR2013/004434, filed May 21, 2013, which claims priority to and the benefit of Korean Patent Application Nos. 10-2013-0056939, filed May 21, 2013 and 10-2012-0053817, filed May 21, 2012, all of which are hereby incorporated by reference in their entirety as if fully set forth herein.

BACKGROUND

1. Field of the Invention

The present application relates to an optical member, a pressure-sensitive adhesive composition, and a liquid crystal display.

2. Discussion of Related Art

Various optical members including a polarizing plate, a retardation plate, an optical compensation film, a reflective sheet, a protective film and a brightness-enhancing film may be attached to a liquid crystal display (LCD) by a pressure-sensitive adhesive. Research on providing durability to the pressure-sensitive adhesive is actively progressing to maintain long-term pressure-sensitive adhesive strength even when an LCD is exposed to an external environment.

Particularly, when the pressure-sensitive adhesive is used in a pressure-sensitive adhesive film used for a mobile phone such as a smart phone, as mobile devices have recently become thinner, a thickness of the pressure-sensitive adhesive film has also been reduced. For this reason, an available range of thicknesses of the pressure-sensitive adhesive is limited to 20 μm or less. In addition, a pressure-sensitive adhesive applied to a polarizing plate for a TV is also showing a tendency to become thinner.

SUMMARY OF THE INVENTION

The present application is directed to providing an optical member, a pressure-sensitive adhesive composition and an LCD.

One aspect of the present application provides an optical member. The optical member of the present application includes a base layer and a pressure-sensitive adhesive layer. The pressure-sensitive adhesive layer includes an acryl polymer having polymerization units derived from a first (meth)acrylic acid ester monomer, a crosslinkable monomer including a crosslinkable functional group except an acid functional group, and a second (meth)acrylic acid ester monomer. Accordingly, the optical member having a pressure-sensitive adhesive layer having a small thickness of 20 μm or less and excellent endurance reliability may be provided.

The "pressure-sensitive adhesive composition" used herein is in a state in which a crosslinking structure is not realized, and the "pressure-sensitive adhesive layer" used herein is in a state in which a crosslinking structure is realized.

Hereinafter, the optical member of the present application will be described in further detail.

In one example, the optical member includes a base layer; and a pressure-sensitive adhesive layer formed on one or both surfaces of the base layer. The base layer is a sheet, film or device having optical characteristics without particular limitation, and thus may be one of various optical sheets, films and devices known in the art. For example, the base layer may be a polarizer, a polarizing plate, a retardation plate, a viewing angle compensation film or a brightness enhancing film. Here, the polarizer refers to a sheet, film or device having a polarizing function, and the polarizing plate refers to a stacked structure of a polarizer and a layer, sheet, film or device having at least one intended function. Here, the layer, sheet, film or device having at least one intended function may be, but is not limited to, a protective film, a hard coating layer, an anti-reflection layer, or a retardation layer.

The pressure-sensitive adhesive layer formed on one or both surfaces of the base layer may have a thickness of 20 μm or less, for example, 19 μm or less, 18 μm or less, 17 μm or less, 15 μm or less or 13 μm or less, and the base layer may be attached by the pressure-sensitive adhesive layer to a liquid crystal panel to be described later.

In one embodiment, the pressure-sensitive adhesive layer may include an acryl polymer, which may have polymerization units derived from a first (meth)acrylic acid ester monomer, a crosslinkable monomer and a second (meth)acrylic acid ester monomer.

The first (meth)acrylic acid ester monomer may be, for example, a monomer capable of forming a homopolymer having a glass transition temperature of less than 0° C., for example, −70° C. to −30° C., −50° C. to −10° C., −40° C. to −30° C., −60° C. to −50° C., or −30° C. to −20° C.

The first (meth)acrylic acid ester monomer may be a monomer capable of forming a homopolymer having a glass transition temperature within the above-described range, and may be, but is not particularly limited to, for example, n-butyl acrylate (n-BA), ethyl acrylate (EA), 2-ethylhexyl acrylate (2-EHA) or isooctyl acrylate (IOA).

For example, as the first (meth)acrylic acid ester monomer, the n-butyl acrylate is a monomer capable of forming a homopolymer having a glass transition temperature of −55° C., is easily polymerized, and has suitable physical properties to be used in a pressure-sensitive adhesive, and thus may be used as a main monomer in manufacturing an acryl polymer included in the pressure-sensitive adhesive layer. In this case, the pressure-sensitive adhesive layer including the acryl polymer prepared using the n-butyl acrylate as a main monomer may have a glass transition temperature of −50° C. to 0° C., for example, −40° C. to −10° C., −30° C. to −20° C. or −20° C. to 0° C., and thus the pressure-sensitive adhesive layer may exhibit pressure-sensitive adhesive property at room temperature.

The crosslinkable monomer may include a crosslinkable functional group except an acid functional group, and the acid functional group may be, for example, a carboxyl group, a sulfuric acid group, or a phosphoric acid group. The crosslinkable monomer having a crosslinkable functional group except an acid functional group is included in the acryl polymer as a polymerization unit to have cohesive strength and adhesive strength by a crosslinking reaction with a crosslinking agent to be described later. The crosslinkable monomer having a crosslinkable functional group except an acid functional group is not particularly limited as long as it is not a monomer including an acid functional group such as a carboxyl acid, for example, an acrylic acid, and thus may be, for example, a monomer including a crosslinkable functional group for a crosslinking reaction such as a hydroxyl group, a glycidyl group, an isocyanate group or a nitrogen-containing functional group. When the monomer including the acid functional group is used, an ITO layer may be corroded.

Since the acryl polymer included in the pressure-sensitive adhesive layer includes a crosslinkable functional group except the acid functional group, the acryl polymer may have an acid value of 10 or less, for example, 9 or less, 7 or less, 5 or less, 3 or less, 1 or less or 0.1 or less. The "acid value" used herein refers to the mg number of potassium hydroxide required to neutralize a free fatty acid or resin acid contained in 1 g of a sample.

In addition, when the pressure-sensitive adhesive layer includes a crosslinkable functional group including an acid functional group, for example, a (meth)acrylate having an acid functional group such as a carboxyl group, a sulfonic acid group or a phosphoric acid group, the acid value of the acryl polymer may be controlled to be 5 or less, for example 3 or less, 2 or less, 1 or less, or 0.1 or less. The acid value may be controlled according to a blending amount of the (meth)acrylate having an acid functional group. For example, the above acid value may be satisfied by controlling a content of the acrylic acid to 1 part by weight or less with respect to 100 parts by weight of the n-butyl acrylate when the acryl polymer is prepared by copolymerizing the n-butyl acrylate and an acrylic acid.

The term "(meth)acrylate" used herein refers to an acrylate or a methacrylate, and other terms using "(meth)" are the same as described above.

In one embodiment, the crosslinkable functional group except an acid functional group may include, but is not limited to, at least one selected from the group consisting of a hydroxyl group, a glycidyl group, an isocyanate group and a nitrogen-containing functional group. The crosslinkable monomer including the hydroxyl group may be, but is not limited to, for example, a monomer including a hydroxyl group such as hydroxyethyl (meth)acrylate, hydroxypropyl (meth)acrylate, hydroxybutyl (meth)acrylate, hydroxyhexyl (meth)acrylate, hydroxyoctyl (meth)acrylate, hydroxyethyleneglycol (meth)acrylate or hydroxypropyleneglycol (meth)acrylate, or a combination of at least one thereof. The crosslinkable monomer including an isocyanate group may be, but is not limited to, tolylene diisocyanate, xylene diisocyanate, diphenylmethane diisocyanate, hexamethylene diisocyanate, isoboron diisocyanate, tetramethylxylene diisocyanate or naphthalene diisocyanate, or a reaction product thereof with a polyol. The crosslinkable monomer including a diglycidyl group may be, but is not limited to, for example, glycidyl (meth)acrylate, an epoxyalkyl (meth)acrylate or an epoxycycloalkylalkyl (meth)acrylate. The crosslinkable monomer including a nitrogen-containing functional group may be, but is not limited to, for example, (meth)acrylonitrile, (meth)acrylamide, N-methyl (meth)acrylamide, N-methylol (meth)acrylamide N,N-methylenebis acrylamide, N,N-dimethyl (meth)acrylamide, N,N-diethyl (meth)acrylamide, N-vinyl pyrrolidone or N-vinyl caprolactam.

In one embodiment, the acryl polymer includes a second (meth)acrylic acid ester monomer as a polymerization unit, and the second (meth)acrylic acid ester monomer may be included in the acryl polymer to enhance endurance reliability of the pressure-sensitive adhesive layer. The "endurance reliability" used herein refers to a property in which lifting or bubbling does not occur even after considerable time of approximately 500 hours or more at a temperature of 60° C. or more and a humidity of approximately 90% after a pressure-sensitive adhesive is attached. The endurance reliability of the pressure-sensitive adhesive layer may be determined according to factors including a molecular structure of the acryl polymer included in the pressure-sensitive adhesive layer, and a glass transition temperature, a weight average molecular weight and a storage modulus of the pressure-sensitive adhesive layer.

Here, the second (meth)acrylic acid ester monomer may be a monomer capable of forming a homopolymer having a glass transition temperature (Tg) of 0 to 100° C., and for example, a monomer capable of forming a homopolymer having a glass transition temperature of 10° C. to 90° C., 10° C. to 80° C., 10° C. to 70° C., 10° C. to 60° C., 10° C. to 50° C. or 10° C. to 45° C.

Due to the second (meth)acrylic acid ester monomer capable of forming a homopolymer having a glass transition temperature within the above range, the pressure-sensitive adhesive layer may have excellent endurance reliability despite a small thickness. The higher a glass transition temperature the homopolymer of the second (meth)acrylic acid ester monomer has, the higher a glass transition temperature the pressure-sensitive adhesive layer has. Thus, the durability is enhanced. However, when the glass transition temperature of the homopolymer of the second (meth)acrylic acid ester monomer is more than 100° C., the pressure-sensitive adhesive layer loses viscoelasticity and therefore may not be used as a pressure-sensitive adhesive, and a cell may be bent.

The second (meth)acrylic acid ester monomer may be, but is not limited to, an acrylate monomer having a linear or branched alkyl group having 1 to 6 carbon atoms, for example, a linear or branched alkyl group having 2 to 4, 3 to 5 or 3 to 4 carbon atoms. For example, when an alicyclic or cyclic compound like a benzene ring, which is neither linear nor branched, is included at a terminal end of the second (meth)acrylic acid ester monomer, a volume of the second (meth)acrylic acid ester monomer becomes larger, and the endurance reliability of the pressure-sensitive adhesive layer is degraded.

The second (meth)acrylic acid ester monomer may form a homopolymer having the above range of glass transition temperature, and may be any one of the monomers having linear and branched alkyl groups having 1 to 6 carbon atoms without particular limitation. For example, the second (meth)acrylic acid ester monomer may be methyl acrylate (MA), t-butyl acrylate (t-BA), methyl methacrylate (MMA), vinyl acrylate (VA), or styrene.

For example, when methyl acrylate having a glass transition temperature of the homopolymer of 10° C. is used to prepare an acryl polymer, it is more easily polymerized than conventionally used methyl methacrylate having a glass transition temperature of the homopolymer of 105° C., thereby exhibiting excellent productivity, and suitably maintaining physical properties such as cohesive strength, peeling strength and durability of a finally formed pressure-sensitive adhesive layer.

In addition, for example, when the pressure-sensitive adhesive layer is formed using t-butyl acrylate having a glass transition temperature of a homopolymer of 43° C., it maintains transparency and has a cross-shaped branched terminal end, and thus a glass transition temperature of the finally formed pressure-sensitive adhesive layer is enhanced, which is effective in improving endurance reliability.

The acryl polymer may have a polymerization unit derived from 1 to 1000 parts by weight of the first (meth)acrylic acid ester monomer with respect to 100 parts by weight of the second (meth)acrylic acid ester monomer. When the second (meth)acrylic acid ester monomer and the first (meth)acrylic acid ester monomer are polymerized in the above range, even when the pressure-sensitive adhesive layer including the acryl polymer is formed to a small thickness, it may have excellent endurance reliability.

For example, the acryl polymer may have a polymerization unit derived from 1 to 1000 parts by weight, 125 to 900 parts by weight, 130 to 900 parts by weight, 150 to 850 parts by weight or 200 to 400 parts by weight of the first (meth)acrylic acid ester monomer with respect to 100 parts by weight of the second (meth)acrylic acid ester monomer, but the present application is not limited thereto. When the second (meth)acrylic acid ester monomer is polymerized in a higher ratio than the first (meth)acrylic acid ester monomer, that is, the first (meth)acrylic acid ester monomer is polymerized at a content ratio of less than 1 part by weight with respect to 100 parts by weight of the second (meth) acrylic acid ester monomer, the glass transition temperature of the pressure-sensitive adhesive layer is excessively high, and thus it is difficult to maintain viscosity, elasticity and fixation to serve as a pressure-sensitive adhesive at room temperature. In contrast, when the second (meth)acrylic acid ester monomer is polymerized in too low of a weight ratio, compared with the first (meth)acrylic acid ester monomer, that is, the first (meth)acrylic acid ester monomer is polymerized in a content ratio exceeding 1000 parts by weight with respect to 100 parts by weight of the second (meth)acrylic acid ester monomer, it is less effective in improvement of endurance reliability at a small thickness. Unless particularly defined otherwise, the term "parts by weight" used herein refers to a relative "weight ratio."

In one embodiment, when the second (meth)acrylic acid ester monomer is methyl acrylate, the acryl polymer may have a polymerization unit derived from 5 to 50 parts by weight of the methyl acrylate. For example, the acryl polymer may have a polymerization unit derived from 10 to 40 parts by weight, 15 to 30 parts by weight, 20 to 35 parts by weight or 23 to 27 parts by weight of the methyl acrylate, but the present application is not limited thereto. In the above ranges, particularly, when the acryl polymer has a polymerization unit derived from 5 parts by weight of the methyl acrylate, it is highly effective in improvement of durability at a small thickness of less than 15 μm, and when the acryl polymer has a polymerization unit derived from 50 parts by weight or less of the methyl acrylate, a glass transition temperature is not excessively high, bending of a cell may not occur.

The "bending of a cell" refers to a problem in which the pressure-sensitive adhesive layer is contracted together with a polarizing plate and bent due to the access of moisture caused when the an optical member such as the polarizing plate to which the pressure-sensitive adhesive layer is attached is exposed to an external environment.

In addition, for example, when the second (meth)acrylic acid ester monomer is t-butyl acrylate, the acryl polymer may have a polymerization unit derived from 5 to 40 parts by weight of the t-butyl acrylate. For example, the acryl polymer may have a polymerization unit derived from 10 to 30 parts by weight, 12 to 23 parts by weight, 17 to 28 parts by weight or 18 to 22 parts by weight of the t-butyl acrylate, but the present application is not limited thereto. In the above ranges, particularly, when the acryl polymer has a polymerization unit derived from 5 parts by weight or more of the t-butyl acrylate, it is highly effective in improvement of durability at a small thickness of less than 15 μm, and when the acryl polymer has a polymerization unit derived from 40 parts by weight or less of the t-butyl acrylate, the glass transition temperature is not excessively high, and bending of the cell may not occur.

In one embodiment, in the polymerization unit included in the acryl polymer, the maximum content of the t-butyl acrylate may be smaller than that of the methyl acrylate. A glass transition temperature of a homopolymer of the t-butyl acrylate is 43° C., higher than that of a homopolymer of the methyl acrylate, which is 10° C. For this reason, when the maximum content of the t-butyl acrylate is larger than that of the methyl acrylate, the durability may actually be decreased.

In one embodiment, the acryl polymer may have a weight average molecular weight of 500,000 to 2,000,000, for example, 800,000 to 1,800,000, 1,000,000 to 1,900,000, 1,200,000 to 1,990,000, or 1,650,000 to 1,900,000, but the present application is not limited thereto. In the above ranges, the pressure-sensitive adhesive may have a suitable pressure-sensitive adhesive characteristic. Particularly, in the range of 500,000 or more, the endurance reliability of a pressure-sensitive adhesive composition may be sufficiently improved. In addition, when the weight average molecular weight of the acryl polymer is 2,000,000 or less, polymerization may be easily performed. The durability, reliability and viscoelasticity of the pressure-sensitive adhesive layer may be generally dependent on a weight average molecular weight, molecular weight distribution or molecular structure of the acryl polymer, particularly, determined by a weight average molecular weight. The "molecular weight" used herein is used with the same meaning as the "weight average molecular weight."

In one embodiment, the pressure-sensitive adhesive layer may have a dynamic elastic modulus of 0.05 Mpa to 0.08 Mpa at 30° C. and at a frequency of 500 Hz. For example, the dynamic elastic modulus of the pressure-sensitive adhesive layer may be 0.06 Mpa to 0.07 Mpa, 0.07 Mpa to 0.079 Mpa, 0.055 Mpa to 0.075 Mpa, or 0.051 Mpa to 0.0772 Mpa, but the present application is not limited thereto. In the above ranges, the endurance reliability may be suitably maintained at a small thickness of less than 15 μm. Particularly, in the range of 0.05 Mpa or more, suitable adhesive strength may be ensured, and in the range of 0.08 Mpa or less, the bending of the cell described above does not occur. The term "dynamic storage modulus" may be expressed as when sine-type shearing deformation is applied to an elastic body, a viscoelastic material shows stress retardation in an intermediate type, and according to a mathematical representation, one component is in the same phase, and the other component is retarded by pi/2. In this case, a part in the same phase is referred to a dynamic storage modulus, and a part retarded by pi/2 is referred to a loss modulus. That is, a dynamic storage modulus refers to energy stored without loss by elasticity, and a loss modulus refers to energy lost by viscosity. Here, the dynamic storage modulus may relate to pressure-sensitive adhesive characteristic of the pressure-sensitive adhesive and endurance reliability, and may be affected by a glass transition temperature of a monomer.

Here, the acryl polymer may be polymerized by a polymerization method such as solution polymerization, photopolymerization, bulk polymerization, suspension polymerization or emulsion polymerization. For example, the acryl polymer may be prepared by solution polymerization. Specifically, the acryl polymer may be prepared by adding an initiator to a monomer mixture solution in which monomers are uniformly mixed at a temperature of 50° C. to 140° C.

In addition, the acryl polymer may be prepared by photopolymerization by selecting a well known suitable photoinitiator. The photoinitiator capable of being applied to the photopolymerization may be, but is not limited to, an organic peroxide such as benzoylperoxide, 1,1-bis(tertiary-butylperoxy)-3,3,5-triethylcyclohexane, tertiarybutylperoxyacetate, tertiarybutylperoxybenzoate, tertiarybutyl peroxy-2-ethylhexanoate, tertiarybutyl peroxyisopropylcarbonate, di-2-ethylhexylperoxy dicarbonate, diisopropylperoxy dicarbonate, di-3-methoxybutylperoxy dicarbonate, di-3,3,5-trimethylhexanoyl peroxide, ditertiarybutyl peroxide, lauroyl peroxide, dicunylperoxide, or methyletherketone peroxide; a hydroperoxide such as butyl hydro peroxide, or cumyl hydro peroxide; an oxidant such as hydrogen peroxide, ammonium persulfate, nitric acid and a salt thereof, perchloric acid and a salt thereof, sulfuric acid and a salt thereof, hypochlorous acid and a salt thereof, permanganic acid and a salt thereof, chromic acid and a salt thereof, lead dioxide, manganese dioxide, copper oxide, iron chloride, fluorine, chlorine, bromine, or iodine; a reductant such as sodiumbrohydride, formaldehyde, acetaldehyde, amine, or hydrazine; a means radiating heat, a UV ray, or a high energy wavelength; or electron transfer in an electrolyte.

For example, the acryl polymer may be prepared by any one of the polymerization methods described above after the first (meth)acrylic acid ester monomer, the crosslinkable monomer including a crosslinkable functional group except an acid functional group, and the second (meth)acrylic acid ester monomer are mixed in a solvent.

The solvent may be one of various solvents known in the art, for example, ethyl acetate (EAc), N-methyl-2-pyrrolidone (NMP), gamma-butyrolactone (GBL) dimethylformamide (DMF), dimethylacetamide (DMAc) or teterahydrofuran (THF), but the present application is not limited thereto.

The optical member includes a pressure-sensitive adhesive layer having excellent endurance reliability, despite a small thickness, as described above. In addition, since the pressure-sensitive adhesive layer has excellent producibility, transparency and an antistatic property, the optical member may be effectively applied to various optical devices or parts, or displays devices or parts. Particularly, the optical member may be effectively used in a polarizer, a polarizing plate, a phase retardation plate, a viewing angle compensation film, a reflective sheet, a protective sheet or a brightness enhancing film, which is used in an LCD.

Another aspect of the present application provides a pressure-sensitive adhesive composition. The exemplary pressure-sensitive adhesive composition may be used to form a pressure-sensitive adhesive layer included in the optical member. Accordingly, respective components included in the pressure-sensitive adhesive composition, or improvement in endurance reliability of the pressure-sensitive adhesive layer formed by the pressure-sensitive adhesive composition are the same as described with regard to the optical members.

In one embodiment, the pressure-sensitive adhesive composition may further include a crosslinking agent. The crosslinking agent may be further included to derive a crosslinking reaction between acryl polymers, and serve to enhance adhesion reliability since a cohesive strength of the pressure-sensitive adhesive layer is maintained at an increased temperature due to formation of a crosslinking structure.

In one embodiment, the crosslinking agent may be suitably selected from various known crosslinking agents such as a monofunctional and multifunctional crosslinking agents without particular limitation in consideration of a crosslinkable functional group included in the pressure-sensitive adhesive composition. For example, the crosslinking agent may be, but is not limited to, at least one selected from the group consisting of an isocyanate-based compound, an epoxy-based compound, an aziridine-based compound and a metal chelate-based compound. In addition, the isocyanate-based compound may be, but is not particularly limited to, for example, at least one selected from the group consisting of toluene diisocyanate, xylene diisocyanate, diphenylmethane diisocyanate, hexamethylene diisocyanate, isoboron diisocyanate, tetramethylxylene diisocyanate, naphthalene diisocyanate triphenylmethane triisocyanate, methylenebis(4-phenylmethane) triisocyanate and reaction products thereof with a polyol such as trimethylolpropane. The epoxy-based compound may be, but is not limited to, for example, at least one selected from the group consisting of ethyleneglycol diglycidylether, polyethyleneglycol diglycidylether, triglycidylether, glycerine diglycidylether, glycerine triglycidylether, 1,6-hexanediol diglycidylether, trimethylolpropane triglycidylether, diglycidylaniline, N,N,N',N'-tetraglycidyl ethylenediamine and N,N,N',N'-tetraglycidyl-1,3-dimethylbenzene. In addition, the aziridine-based compound may be, but is not limited to, at least one selected from the group consisting of N,N'-tolene-2,4-bis(1-aziridinecarboxamide), N,N'-diphenylmethane-4,4'-bis (1-aziridinecarboxamide), triethylene melamine, bisisoprothaloyl-1-(2-methylaziridine) and tri-1-aziridynylphosphineoxide.

In one embodiment, the crosslinking agent may be included in an amount of 0.01 to 10 parts by weight, and for example, 0.01 to 3 parts by weight, 1 to 7 parts by weight, 2 to 5 parts by weight, or 0.01 to 5 parts by weight with respect to 100 parts by weight of the pressure-sensitive adhesive composition, but the present application is not limited thereto. In the above ranges, the cohesive strength and durability of the pressure-sensitive adhesive layer may be excellently maintained.

In addition, in the pressure-sensitive adhesive composition, without affecting the effect of the present application, at least one additive selected form the group consisting of a pressure-sensitive adhesiveness-providing resin, a silane-based coupling agent, an antistatic agent, a near infra red (NIR) absorbent, a curing agent, a crosslinking agent, a UV stabilizer, an antioxidant, a coloring agent, a reinforcing agent, a filler, a foaming agent, a surfactant and a plasticizer may be further included.

For example, the pressure-sensitive adhesive composition of the present application may further include a tackifier, and thus exhibit pressure-sensitive adhesiveness. A kind of the tackifier may be, but is not particularly limited to, for example, at least one of an epoxy resin, a hydrocarbon resin or a hydrogenated product thereof, a rosin resin or a hydrogenated product thereof, a rosin ester resin or a hydrogenated product thereof, a terpene resin or a hydrogenated product thereof, a terpene phenol resin or a hydrogenated product thereof, a polymerized rosin resin or a polymerized rosin ester resin.

The tackifier may be included in an amount of 1 to 100 parts by weight with respect to 100 parts by weight of the pressure-sensitive adhesive composition. When the content is 1 part by weight or more, an addition effect may be expected, and when the content is 100 parts by weight or less, compatibility and cohesive strength-enhancing effects may be expected.

The pressure-sensitive adhesive composition may further include a silane-based coupling agent. The silane-based coupling agent may be, for example, ethyltrimethoxysilane, β-(3,4 epoxycyclohexyl), γ-glycidoxypropyl triethoxysilane, γ-glycidoxypropyl trimethoxysilane, γ-glycidoxypropyl methyldiethoxysilane, γ-glycidoxypropyl triethoxysilane, 3-mercaptopropyl trimethoxysilane, vinyltrimethoxysilane, vinyltriethoxy silane, γ-methacryloxypropyl trimethoxysilane, γ-methacryloxypropyl trimethoxysilane, γ-methacryloxypropyl triethoxysilane, γ-aminopropyl trimethoxysilane, γ-aminopropyl triethoxysilane, 3-isocyanatopropyl triethoxysilane, γ-acetoacetatepropyl trimethoxysilane, γ-acetoacetatepropyl triethoxysilane, γ-acetoacetatepropyl trimethoxysilane, β-cyanoacetyl trimethoxysilane, β-cyanoacetyl triethoxysilane or acetoxyaceto trimethoxysilane, or a mixture of at least one thereof. Particularly, a silane-based coupling agent having an acetoacetate group or a β-cyanoacetyl group may be used, but the present application is not limited thereto.

The silane-based coupling agent may be included in the pressure-sensitive adhesive composition in an amount of 0.01 to 5 parts by weight with respect to 100 parts by weight of the pressure-sensitive adhesive composition. For example, the silane-based coupling agent may be included in the pressure-sensitive adhesive composition in an amount of 0.1 to 3 parts by weight, 1 to 4 parts by weight, 2 to 3 parts by weight, or 0.01 to 1 parts by weight with respect to 100 parts by weight of the pressure-sensitive adhesive composition, but the present application is not limited thereto. When the content is 0.01 parts by weight or more, a pressure-sensitive adhesive strength-increasing effect may be expected, and when the content is 5 parts by weight or less, the composition is secured from degradation of endurance reliability.

In addition, the pressure-sensitive adhesive composition may further include an antistatic agent, which may be any one of compounds having excellent compatibility with another component included in the composition such as an acrylate-based copolymer, thereby not having a bad influence on transparency, workability and durability of a pressure-sensitive adhesive, and providing an antistatic property to the pressure-sensitive adhesive.

The antistatic agent may be included in an amount of 0.01 to 5 parts by weight with respect to 100 parts by weight of the pressure-sensitive adhesive composition. For example, it may be included in the pressure-sensitive adhesive composition in an amount of 0.1 to 3 parts by weight, 1 to 4 parts by weight, 2 to 3 parts by weight and 0.01 to 2 parts by weight with respect to 100 parts by weight of the pressure-sensitive adhesive composition, but the present application is not limited thereto. When the content is 0.01 parts by weight or more, a desired antistatic effect may be obtained, and when the content is 5 parts by weight or less, due to high compatibility with another component, the pressure-sensitive adhesive is secured from degradation in endurance reliability.

The pressure-sensitive adhesive composition may further include an NIR absorbent, a curing agent or a UV stabilizer for photocuring, and an additive such as an antioxidant, a coloring agent, a reinforcing agent, a filler, a foaming agent, a surfactant or a plasticizer to complement physical properties as needed.

A method of forming a pressure-sensitive adhesive layer using the pressure-sensitive adhesive composition is not particularly limited, and may be a method of coating the pressure-sensitive adhesive composition or a coating solution including the same on a base using a conventional means such as a comma coater or bar coater and curing the coated result, or a method of coating the pressure-sensitive adhesive composition on a surface of a peelable base, curing the coated result, and transferring the formed pressure-sensitive adhesive layer.

In addition, in this process, a method of curing the pressure-sensitive adhesive composition is not particularly limited, and may be performed through a suitable aging process to react an acryl polymer included in the composition and a crosslinking agent, or light radiation, for example, UV radiation, to derive a polymerization reaction of a photopolymerizable compound. In one embodiment, the UV radiation may be performed using a means such as a high pressure mercury lamp, an electrodeless lamp or a xenon lamp. In addition, during the UV curing, an intensity of radiation is not particularly limited as long as it is controlled not to damage any physical properties and to sufficiently perform curing. Here, a luminance may be 50 to 1,000 mW/cm$^2$, and an intensity of radiation may be 50 to 1,000 mJ/cm$^2$.

Still another aspect of the present application provides an LCD in which the optical member is attached to a liquid crystal panel by a pressure-sensitive adhesive layer of the optical member. For example, the optical member may be a polarizing plate.

Generally, a pressure-sensitive adhesive for a polarizing plate used in the LCD is required to have physical properties such as high elastic recovery, a law peel-off phenomenon, and a low bubbling phenomenon in a dry and thermal condition. That is, it is necessary to recover a dent in a pressure-sensitive adhesive layer when polarizing plates cut after a producing process are aged in a folded state or indentations are formed in the pressure-sensitive adhesive layer due to impurities present between polarizing plates during delivery process. To this end, high elastic recovery is needed, the polarizing plate should not be peeled off from a glass substrate under a high temperature and high humidity condition when the polarizing plate is attached to the glass substrate, and bubbles should not be generated under a dry and thermal condition (approximately at 80° C.).

Since the pressure-sensitive adhesive layer included in the optical member according to the present application has a dynamic storage modulus of 0.5 Mpa or more at room temperature, the pressure-sensitive adhesive layer may have high elastic recovery, and may have excellent pressure-sensitive adhesiveness even when it is formed to a small thickness of less than 15 μm. In addition, since the pressure-sensitive adhesive layer included in the optical member according to the present application may include a second (meth)acrylic acid ester monomer capable of forming a homopolymer having a glass transition temperature of 0 to 100° C., the pressure-sensitive adhesive layer has excellent durability, and thus a peel-off phenomenon and a bubbling phenomenon under a dry and thermal condition may not occur.

ADVANTAGEOUS EFFECTS OF THE INVENTION

The present application provides an optical member. According to the present application, the optical member can have excellent endurance reliability even when a pressure-sensitive adhesive layer is formed to have a thickness of 20 μm or less, and prevent corrosion of an ITO layer since an acid material conventionally used such as an acrylic acid is not used.

DETAILED DESCRIPTION OF EXEMPLARY EMBODIMENTS

Hereinafter, a pressure-sensitive adhesive composition will be described in further detail with reference to Examples and Comparative Examples, but the scope of the composition is not limited to the following Examples.

Preparation Example 1

Preparation of Acryl Polymer (A1)

A monomer mixture composed of 89 g of n-butyl acrylate, 10 g of methyl acrylate (MA) and 1 g of hydroxybutyl acrylate (HBA) was put into a 1000 cc reaction vessel equipped with a cooling apparatus to facilitate temperature control and reflux a nitrogen gas, and 100 g of ethyl acetate (EAc) was put into a solvent. Afterward, to remove oxygen, the mixture was purged with a nitrogen gas for 20 minutes, and maintained at 60° C. After the mixture was uniformly blended, and 0.03 g of azobisisobutyronitrile (AIBN) diluted with a reaction initiator in ethyl acetate at a concentration of 50% was added. The mixture was reacted for 8 hours, thereby preparing an acryl polymer having a weight average molecular weight of 1,790,000.

Preparation Example 2

Preparation of Acryl Polymer (A2)

An acryl polymer having a weight average molecular weight of 1,670,000 was prepared by the same method as described in Preparation Example 1, except that a monomer mixture in which 79 g of n-butyl acrylate (n-BA), 20 g of methyl acrylate (MA) and 1 g of hydroxybutyl acrylate (HBA) were mixed was used instead of the monomer mixture prepared in Preparation Example 1.

Preparation Example 3

Preparation of Acryl Polymer (A3)

An acryl polymer having a weight average molecular weight of 1,890,000 was prepared by the same method as described in Preparation Example 1, except that a monomer mixture in which 59 g of n-butyl acrylate (n-BA), 40 g of methyl acrylate (MA) and 1 g of hydroxybutyl acrylate (HBA) were mixed was used instead of the monomer mixture prepared in Preparation Example 1.

Preparation Example 4

Preparation of acryl polymer (A4)

An acryl polymer having a weight average molecular weight of 1,760,000 was prepared by the same method as described in Preparation Example 1, except that a monomer mixture in which 89 g of n-butyl acrylate (n-BA), 10 g of t-butyl acrylate (t-BA) and 1 g of hydroxybutyl acrylate (HBA) were mixed was used instead of the monomer mixture prepared in Preparation Example 1.

Preparation Example 5

Preparation of Acryl Polymer (A5)

An acryl polymer having a weight average molecular weight of 1,770,000 was prepared by the same method as described in Preparation Example 1, except that a monomer mixture in which 69 g of n-butyl acrylate (n-BA), 30 g of t-butyl acrylate (t-BA) and 1 g of hydroxybutyl acrylate (HBA) were mixed was used instead of the monomer mixture prepared in Preparation Example 1.

Example 1

Preparation of Pressure-sensitive Adhesive Composition 0.03 parts by weight of N,N,N',N'-tetraglycidyl-1,3-dimethylbenzene as an epoxy-based crosslinking agent and 0.2 parts by weight of adducts of tolylene diisocyanate with trimethylolpropane as a multifunctional isocyanate-based crosslinking agent with respect to 100 parts by weight of the acryl polymer (A1) prepared above were respectively diluted in an ethylacetate solution at 10 wt %, and uniformly mixed to a suitable concentration in consideration of coatability.

Formation of Pressure-sensitive Adhesive Film

The pressure-sensitive adhesive composition was coated and dried on one surface of a biaxially-oriented poly(ethylene terephthalate) (PET) film (thickness: 15 μm), thereby forming a coating layer having a uniform thickness of 13 μm. Subsequently, a releasing film was laminated on the coating solution and aged for 3 days under a constant temperature (25° C.) and constant humidity condition, thereby forming a pressure-sensitive adhesive film.

Example 2

A pressure-sensitive adhesive composition and a pressure-sensitive adhesive film having a coating layer having a uniform thickness of 13 μm were formed by the same method as described in Example 1, except that the acryl polymer (A2) prepared in Example 2 was used.

Example 3

A pressure-sensitive adhesive composition and a pressure-sensitive adhesive film having a coating layer having a uniform thickness of 13 μm were formed by the same method as described in Example 1, except that the acryl polymer (A3) prepared in Example 3 was used.

Example 4

A pressure-sensitive adhesive composition and a pressure-sensitive adhesive film having a coating layer having a uniform thickness of 13 μm were formed by the same method as described in Example 1, except that the acryl polymer (A4) prepared in Example 4 was used.

Example 5

A pressure-sensitive adhesive composition and a pressure-sensitive adhesive film having a coating layer having a uniform thickness of 13 μm were formed by the same method as described in Example 1, except that the acryl polymer (A5) prepared in Example 5 was used.

Comparative Example 1

An acryl polymer (B1) having a weight average molecular weight of 1,800,000 was prepared by the same method as described in Preparation Example 1, and a pressure-sensitive adhesive composition and a pressure-sensitive adhesive film having a coating layer having a uniform thickness of 13 μm were formed, except that a monomer mixture in which 79 g of n-butyl acrylate (n-BA), 20 g of phenol acrylate (PHEA)

and 1 g of hydroxybutyl acrylate (HBA) were mixed was used instead of the monomer mixture used in Preparation Example 1.

Comparative Example 2

An acryl polymer (B2) having a weight average molecular weight of 1,820,000 was prepared by the same method as described in Preparation Example 1, and a pressure-sensitive adhesive composition and a pressure-sensitive adhesive film having a coating layer having a uniform thickness of 13 μm were formed, except that a monomer mixture in which 79 g of n-butyl acrylate (n-BA), 20 g of isobornyl acrylate (IBOA) and 1 g of hydroxybutyl acrylate (HBA) were mixed was used instead of the monomer mixture used in Preparation Example 1.

Comparative Example 3

An acryl polymer (B3) having a weight average molecular weight of 1,760,000 was prepared by the same method as described in Preparation Example 1, and a pressure-sensitive adhesive composition and a pressure-sensitive adhesive film having a coating layer having a uniform thickness of 13 μm were formed, except that a monomer mixture in which 79 g of n-butyl acrylate (n-BA), 20 g of N-vinyl caprolactam (NVC) and 1 g of methyl acrylate (MA) were mixed was used instead of the monomer mixture used in Preparation Example 1.

Comparative Example 4

An acryl polymer (B4) having a weight average molecular weight of 1,800,000 was prepared by the same method as described in Preparation Example 1, and a pressure-sensitive adhesive composition and a pressure-sensitive adhesive film having a coating layer having a uniform thickness of 13 μm were formed, except that a monomer mixture in which 99 g of n-butyl acrylate (n-BA) and 1 g of hydroxybutyl acrylate (HBA) were mixed was used instead of the monomer mixture used in Preparation Example 1.

Comparative Example 5

An acryl polymer (B5) having a weight average molecular weight of 1,800,000 was prepared by the same method as described in Preparation Example 1, and a pressure-sensitive adhesive composition and a pressure-sensitive adhesive film having a coating layer having a uniform thickness of 13 μm were formed, except that a monomer mixture in which 95 g of n-butyl acrylate (n-BA) and 5 g of acrylic acid (AA) were mixed was used instead of the monomer mixture used in Preparation Example 1.

Comparative Example 6

An acryl polymer (B1) having a weight average molecular weight of 1,800,000 was prepared by the same method as described in Preparation Example 1, except that the monomer mixture in which 99 g of n-butyl acrylate (n-BA) and 1 g of hydroxybutyl acrylate (HBA) were mixed was used as the monomer mixture in Preparation Example 1, and a pressure-sensitive adhesive composition and a pressure-sensitive adhesive film having a coating layer having a uniform thickness of 13 μm were formed by the same method as described in Example 1, except that 12 parts by weight of tris 2-hydroxy ethyl isocyanurate triacrylate (M370) was added with respect to 100 parts by weight of a solid content of a pressure-sensitive adhesive.

Example of Test

Physical properties were evaluated by the following methods with respect to the pressure-sensitive adhesive compositions or films formed in Examples and Comparative Examples.

Measurement Method 1. Measurement of Weight Average Molecular Weight

A weight average molecular weight of the pressure-sensitive adhesive composition was measured using GPC under the following conditions. To draw a calibration curve, standard polystyrene of an Agilent system was used, and measurement results were converted.

<Conditions for Measuring Weight Average Molecular Weight>

Measuring Tool: Agilent GPC (Agilent 1200 series, USA)
Column: two connected PL mixed B
Column Temperature: 40° C.
Eluent: Tetrahydrofuran
Flow Rate: 1.0 mL/min
Concentration: ~2 mg/mL (100 μL injection)

Measurement Method 1. Measurement of Dynamic Storage Modulus

A dynamic storage modulus of the pressure-sensitive adhesive composition was measured using ARES manufactured by TA corp. Dynamic storage moduli of the pressure-sensitive adhesive compositions in Examples 1 to 5 and pressure-sensitive adhesive compositions in Comparative Examples 1 to 6 were measured at a temperature of 30° C. and a frequency of 500 Hz by frequency sweep with respect to a pressure-sensitive adhesive under conditions of a sample thickness of 1 mm and a deformation ratio of 10% using a parallel plate fixture having a diameter of 8 mm Measurement Method 3. Evaluation of Endurance Reliability To evaluate durability with respect to humidity and thermal resistance of a pressure-sensitive adhesive film attached to a glass for an LCD, the film was left for 500 hours under the condition of a temperature of 60° C. and a relative humidity of 90% and a condition of a temperature of 70° C. and a relative humidity of 90%, and bubbling and peeling were observed.

Evaluation criteria for reliability were as follows:
○: no bubbling or peeling was observed
Δ: a little bubbling or peeling was observed
x: a large amount of bubbling or peeling was observed Measurement Method 4. Measurement of Acid Value An acid value was measured using an automatic titration device (COM-550, Hiranuma Sankyo), and calculated by the following Equation:

$$A = \{(Y-X) \times f \times 5.611\}/M \qquad \text{[Equation 1]}$$

In Equation 1, A is an acid value, Y is a titration amount (ml) of a sample solution, X is a titration amount (ml) of a solution containing 50 g of a mixed solvent, f is a factor of a titration solution, and M is a weight (g) of a polymer sample, and measurement conditions were as follows:

Sample solution: prepared by dissolving approximately 0.5 g of an acryl polymer sample in 50 g of a mixed solvent (toluene/2-propanol/distilled water=50/49.5/0.5, weight ratio)

Titration solution: 0.1N, 2-propanol-type potassium hydroxide solution (Wako Junyaku Kogyo, for test neutralization value of petroleum products)

Electrode: glass electrode, GE-101, Comparative electrode: RE-201

Measurement mode: for test neutralization value of petroleum products

Components and physical properties of the pressure-sensitive adhesive compositions in Examples 1 to 5 and Comparative Examples 1 to 6 according to the above methods are listed in the following Tables 1 and 2.

TABLE 1

| | Weight ratio | Dynamic storage modulus at 30° C., 500 Hz (Mpa) | Molecular weight (10,000) | Thickness (μm) |
|---|---|---|---|---|
| Example 1 acryl polymer (A1) | NBA:MA:HBA = 89:10:1 | 0.0543 | 179 | 13 |
| Example 2 acryl polymer (A2) | NBA:MA:HBA = 79:20:1 | 0.0511 | 167 | 13 |
| Example 3 acryl polymer (A3) | NBA:MA:HBA = 59:40:1 | 0.0772 | 189 | 13 |
| Example 4 acryl polymer (A4) | NBA:t-BA:HBA = 89:10:1 | 0.0638 | 176 | 13 |
| Example 5 acryl polymer (A5) | NBA:t-BA:HBA = 69:30:1 | 0.0541 | 177 | 13 |
| C. Example 1 acryl polymer (B1) | NBA:PHEA:HBA = 79:20:1 | 0.0441 | 180 | 13 |
| C. Example 2 acryl polymer (B2) | NBA:IBOA:HBA = 79:20:1 | 0.049 | 182 | 13 |
| C. Example 3 acryl polymer (B3) | NBA:NVC:HBA = 79:20:1 | 0.0626 | 176 | 13 |
| C. Example 4 acryl polymer (B4) | NBA:HBA = 99:1 | 0.047 | 180 | 13 |
| C. Example 5 acryl polymer (B5) | NBA:AA = 95:5 | 0.078 | 180 | 13 |
| C. Example 6 acryl polymer (B6) | NBA:HBA = 99:1 + M 370 | 0.12 | 180 | 13 |

NBA: n-butyl acrylate
MA: methyl acrylate
t-BA: t-butyl acrylate
HBA: hydroxybutyl acrylate
PHEA: phenol acrylate
IBOA: isobornylacrylate
NVC: n-vinyl caprolactam
AA: acrylic acid
M 370: tris 2-hydroxy ethyl isocyanurate Triacrylate
*C. Example: Comparative Example

TABLE 2

| | Endurance reliability at 60° C., relative humidity of 90% for 500 hours | Endurance reliability at 70° C., relative humidity of 90% for 500 hours | Acid value | Comments |
|---|---|---|---|---|
| Example 1 acryl polymer (A1) | ○ | ○ | 0 | — |
| Example 2 acryl polymer (A2) | ○ | ○ | 0 | — |
| Example 3 acryl polymer (A3) | ○ | ○ | 0 | — |
| Example 4 acryl polymer (A4) | ○ | ○ | 0 | — |
| Example 5 acryl polymer (A5) | ○ | ○ | 0 | — |
| C. Example 1 acryl polymer (B1) | Δ | X | 0 | — |
| C. Example 2 acryl polymer (B2) | Δ | X | 0 | — |
| C. Example 3 acryl polymer (B3) | Δ | X | 0 | — |
| C. Example 4 acryl polymer (B4) | Δ | Δ | 0 | — |
| C. Example 5 acryl polymer (B5) | ○ | ○ | 20 | Corrosion of ITO |
| C. Example 6 acryl polymer (B6) | ○ | ○ | 0 | Bending of cell |

* C. Example: Comparative Example

As shown in Tables 1 and 2, Examples 1 to 5 including the acryl polymer (A1) to the acryl polymer (A5) exhibited excellent endurance reliability despite being formed to a very small thickness of 13 μm.

However, it was shown that the pressure-sensitive adhesive compositions of Comparative Examples 1 to 3 including the acryl polymer (B1) to the acryl polymer (B3), each of which had a monomer having a ring-type terminal end copolymerized in, had poor endurance reliability, and the pressure-sensitive adhesive composition including the acryl polymer (B4) in which a third acrylate-based monomer was not copolymerized according to the present application had slightly better endurance reliability than that in Comparative Examples 1 to 3, but showed insignificant results, compared with those in Examples 1 to 5 according to the present application Meanwhile, the pressure-sensitive adhesive composition including the acryl polymer (B5) prepared by copolymerizing an acrylic acid monomer in Comparative Example 5 had fair endurance reliability. However, the composition had an acid value of 20 due to an acrylic acid showing acidity, and the ITO layer was corroded.

In addition, when tris 2-hydroxy ethyl isocyanurate triacrylate (M 370) was added to the pressure-sensitive adhesive composition including an acryl polymer in Comparative Example 4, the endurance reliability of the composition was improved but a cell was bent. This is because a dynamic storage modulus was increased too much by adding M370, which had a very high glass transition temperature. This could also be confirmed from Table 1.

What is claimed is:

1. An optical member, comprising:
a base layer; and
a pressure-sensitive adhesive layer, which has a glass transition temperature of −50° C. to 0° C., and a dynamic storage modulus of 0.0511 to 0.0772 MPa at 30° C. and a frequency of 500 Hz, including: an acryl polymer which is a polymerized product of monomers consisting essentially of: a first (meth)acrylic acid ester monomer capable of forming a homopolymer having a glass transition temperature of less than 0° C., a crosslinkable monomer including a crosslinkable functional group except an acid functional group, and a second (meth)acrylic acid ester monomer capable of forming a homopolymer having a glass transition temperature of 10° C. to 45° C., which is formed on one or both surfaces of the base layer, and which has a thickness of 15 μm or less,
wherein the acryl polymer has a weight average molecular weight of 1,650,000 to 1,900,000 and has polymerization units derived from 125 to 900 parts by weight of the first (meth) acrylic acid ester monomer with respect to 100 parts by weight of the second (meth)acrylic acid ester monomer,
wherein the first (meth)acrylic acid ester monomer is an alkyl (meth)acrylate, and the second (meth)acrylic acid ester monomer is an alkyl (meth)acrylate,
wherein the base layer is a polarizer, a polarizing plate, a retardation plate, a viewing angle retardation film or a brightness-enhancing film, and
wherein the acryl polymer has an acid value of 0.1 or less.

2. The optical member according to claim 1, wherein the first (meth)acrylic acid ester monomer is an alkyl (meth)acrylate capable of forming a homopolymer having a glass transition temperature of −70° C. to −30° C.

3. The optical member according to claim 1, wherein the second (meth)acrylic acid ester monomer is an alkyl (meth)acrylate having a linear or branched alkyl group having 1 to 6 carbon atoms.

4. The optical member according to claim 1, wherein the second (meth)acrylic acid ester monomer is methyl acrylate or t-butyl acrylate.

5. The optical member according to claim 1, wherein the crosslinkable functional group except an acid functional group is at least one selected from the group consisting of a hydroxyl group, a glycidyl group, an isocyanate group and a nitrogen-containing functional group.

6. A liquid crystal display, in which the optical member of claim 1 is attached to a liquid crystal panel by a pressure-sensitive adhesive layer of the optical member.

* * * * *